United States Patent [19]
Milholen

[11] 4,427,329
[45] Jan. 24, 1984

[54] MONORAIL JIG BOX LOADER

[75] Inventor: Harold J. Milholen, Siler City, N.C.

[73] Assignee: Pearne and Lacy Machine Co., Inc., Siler City, N.C.

[21] Appl. No.: 298,264

[22] Filed: Aug. 31, 1981

[51] Int. Cl.³ .............................................. B65G 57/10
[52] U.S. Cl. ....................................... 414/68; 414/57; 414/85
[58] Field of Search ........................ 414/32, 33, 34, 35, 414/41, 42, 57, 68, 76, 82, 85, 84; 53/154, 534, 537, 538

[56] References Cited
U.S. PATENT DOCUMENTS

| | | | |
|---|---|---|---|
| 3,017,041 | 1/1962 | Hawkes et al. | 414/84 X |
| 3,095,678 | 7/1963 | Cliff et al. | 414/57 X |
| 3,608,746 | 9/1971 | Meyer | 414/41 X |
| 3,917,080 | 11/1975 | Jones | 414/85 X |
| 4,036,350 | 7/1977 | Jones | 414/41 X |

FOREIGN PATENT DOCUMENTS 262152  6/1968  Austria ................................ 414/42

Primary Examiner—Joseph E. Valenza
Assistant Examiner—Ken Muncy
Attorney, Agent, or Firm—Pearne, Gordon, Sessions, McCoy, Granger & Tilberry

[57] ABSTRACT

An automated system is provided for stacking brick in monorail jig box stacking systems. The apparatus includes a plurality of loader subassemblies which sequentially position layers of brick in a jig box supported by a monorail. Each loader assembly includes a supply conveyor operable to consolidate spaced groups of brick in one direction and a marshaling conveyor operable to consolidate groups of brick in a direction perpendicular to such one direction. The two conveyors operate to rearrange the brick so that groups or layers are produced which are sized to provide one full layer in the jig box. A transfer tray receives the layers from the marshaling conveyor and extends to carry such layers into the jig box. A stripper retains the layers in the jig box as the transfer tray is retracted. Camming surfaces carried by the transfer tray ensure that the jig box is properly positioned with respect to the tray before the layer of brick enters the jig box.

12 Claims, 12 Drawing Figures

MONORAIL JIG BOX LOADER

BACKGROUND OF THE INVENTION

This invention relates generally to the manufacture of brick, and more particularly to a novel and improved method and apparatus for forming stacks of brick to supply a strapper.

PRIOR ART

Stacks of brick are usually strapped to form cubes suitable for storage and shipment. Various systems are known for the automatic unloading of kiln cars and for the production of such stacks. U.S. Pat. Nos. 3,392,851; 3,487,959; 3,491,901; 3,601,266; 3,656,634; 3,893,575; and 3,917,081 all describe examples of such machines. These patents are all assigned to the assignee of this invention.

It is also known to manually stack bricks in jig boxes which are supported on a monorail system for progressive movement to a plurality of work stations. At each work station, a worker manually removes groups of brick from an adjacent supply conveyor and manually positions such groups of brick in an adjacent jig box. As the jig boxes are progressively positioned at the various work stations, additional brick are positioned in the box until the box is fully loaded. The box then moves to a strapper station, where the stack is pushed out of the jig box and into the strapper.

SUMMARY OF THE INVENTION

In accordance with one important aspect of this invention, an automated system is provided for loading brick into existing monorail jig box stacking systems to completely eliminate the need for manual operation.

In the illustrated embodiment, supply conveyors operate to move rows of abutting brick onto a marshaling conveyor. The marshaling conveyor conveys the abutting rows transversely with respect to the supply conveyors to a transfer pan or tray. The marshaling conveyor positions the proper number of brick on the transfer tray to form one complete double layer in the jig box. In the illustrated embodiment, the brick located on the supply conveyor are two high and therefore provide pairs of brick resting one on another. The disclosed apparatus operates throughout to handle the brick two high, so each double layer positioned on the transfer tray consists of two courses or layers of aligned and abutting rows of brick.

When the transfer tray is fully loaded, it extends into an adjacent jig box, and as the tray is retracted, a stripper engages the double layer to retain it within the jig box to complete the loading of the double rows as the transfer tray is retracted.

In the illustrated embodiment, the partially loaded jig box then moves to subsequent loading stations, where a similar loading system operates to position another double layer on the preceding double layer, until the box is fully loaded. Thereafter, the stack is pushed out of the jig box in the usual way.

In accordance with another aspect of the invention, the system provides a simple method and apparatus for rearranging brick so that a given layer of substantially any desired size can be produced regardless of the arrangement of the brick on the supply conveyors. With such rearranging apparatus, jig boxes of substantially any size can be automatically loaded from a brick supply having substantially any size of groups of brick.

For example, in the illustrated embodiment the brick delivered to the supply conveyor are arranged in spaced groups, including three endwise abutting rows each, wherein such row contains eight side abutting brick. As mentioned previously, such groups are two high, so each group includes 48 bricks. The illustrated jig boxes, however, are sized to receive layers of two rows each containing 11 brick. Therefore, each double layer delivered to the jig box contains 44 brick, making it necessary to rearrange the grouping of the brick before they reach the jig boxes.

The supply conveyor operates to automatically consolidate or compact the spaced groups thereon in one direction and to deliver spaced groups containing two double rows to the marshaling conveyor. Such spaced groups contain rows having eight side abutting bricks in each row.

The marshaling conveyor then operates to consolidate or compact the spaced groups and produce double rows containing eleven or more side abutting brick in each row. This provides a supply of brick for the transfer tray suitable for producing the required two rows each containing eleven brick. The marshaling conveyor positions eleven brick from each row on the transfer tray, completing the required regrouping operation.

These and other aspects of this invention are illustrated in the accompanying drawings, and are more fully described in the following specification.

DETAILED DESCRIPTION OF THE DRAWINGS

Figure 1:
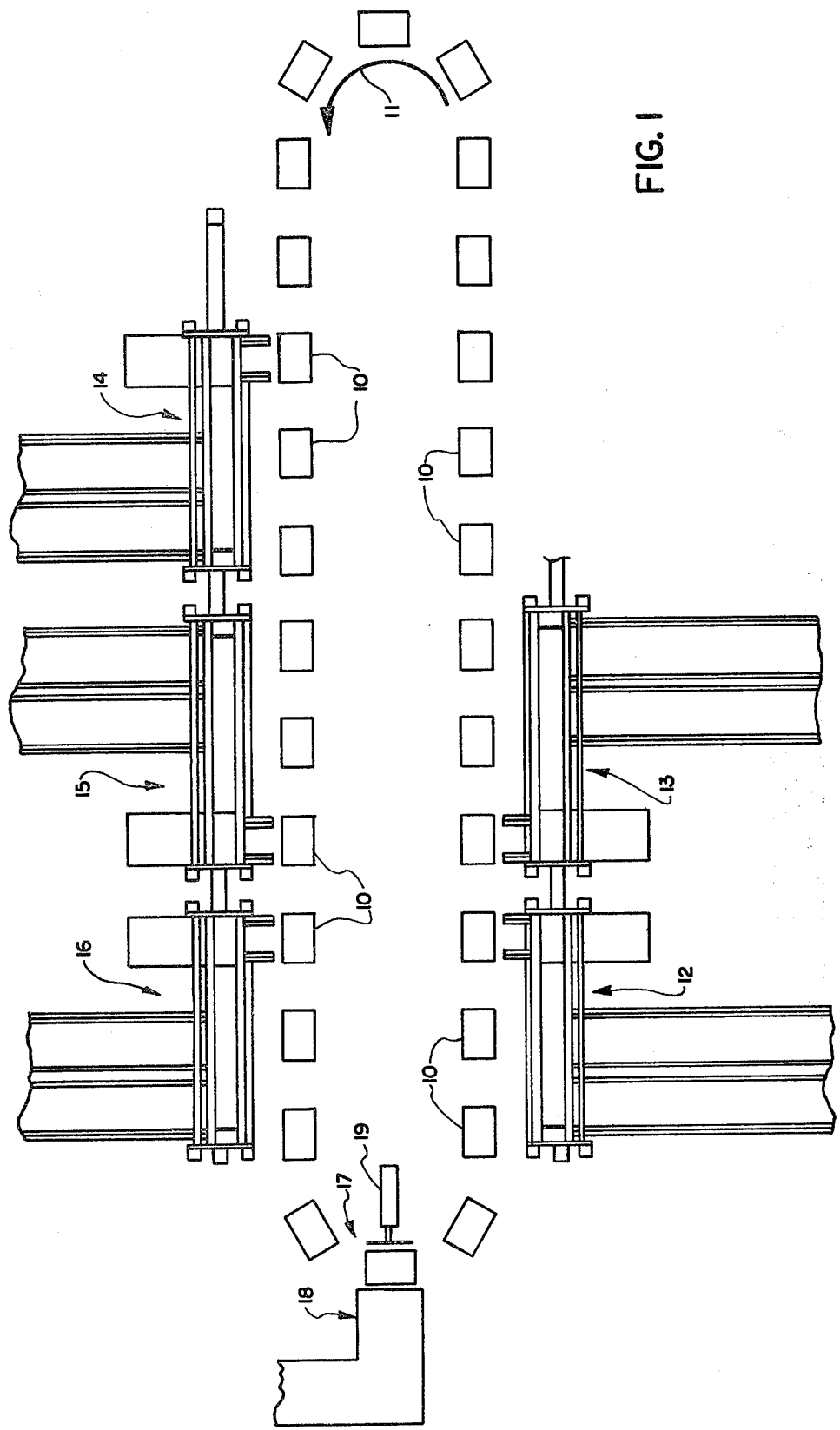
FIG. 1 is a schematic plan view of an overall monorail jig box system, with an automatic loader stacker system in accordance with the present invention.

FIG. 1 schematically illustrates a loader stacker system in accordance with the present invention. In such system, a plurality of jig boxes 10 are supported on a monorail (not illustrated) for stepwise movement in the direction of the arrow 11 along an elongated oval path. Located adjacent to the path of movement are five loading subassemblies 12 through 16 which progressively position brick within the jig boxes 10 as they are progressively moved around the path of movement. An unloader station 17 is provided adjacent to a strapper 18 and is provided with a pusher 19 which pushes the stack of brick from the loaded jig box into the strapper. The strapper operates in the uusual manner to strap the stacks of bricks into cubes which are suitable for storage and handling.

The system including the monorail-supported jig boxes and the unloader station and strapper is known in the prior art, but in such prior art systems, the jig boxes 10 have been manually loaded from supplies of bricks positioned on supply conveyors by a kiln car unloader or the like. In the past manual systems, there are a number of loading stations, each with its own supply conveyor where workers manually remove groups of brick from the conveyors and position such groups in the jig boxes. In such systems, additional bricks are placed in each jig box as it progressively moves around the oval so that a fully loaded jig box is presented to the unloader station each time the jig boxes are indexed to the next position. Such manual loading of jig boxes is, of course, expensive and requires considerable effort on the part of the workers.

In accordance with the present invention, existing monorail jig box systems are automatically loaded from existing supply conveyors making maximum use of existing equipment while providing a fully automated system.

In the illustrated embodiment, there are five similar loader subassemblies, each of which is operable to position a full double layer in a jig box so that after the respective jig boxes move past the five loader subassemblies 12 through 17, the jig box contains a full stack consisting of 10 layers of brick. Further, in the illustrated embodiment, the layers loaded into the jig box contain two endwise abutting rows of 11 laterally abutting brick, so that a fully loaded jig box contains 220 bricks.

Each of the loader subassemblies 12 through 16 is structurally and functionally similar to the other loader subassemblies, except that in some instances, such as in subassemblies 13, 14 and 16, they are left-hand as viewed from above, as distinguished from the subassemblies 12 and 15, which are right-hand. Therefore, a description of one of the loader subassemblies 12 (illustrated in FIG. 2) applies equally to each of the others.

Figure 2:
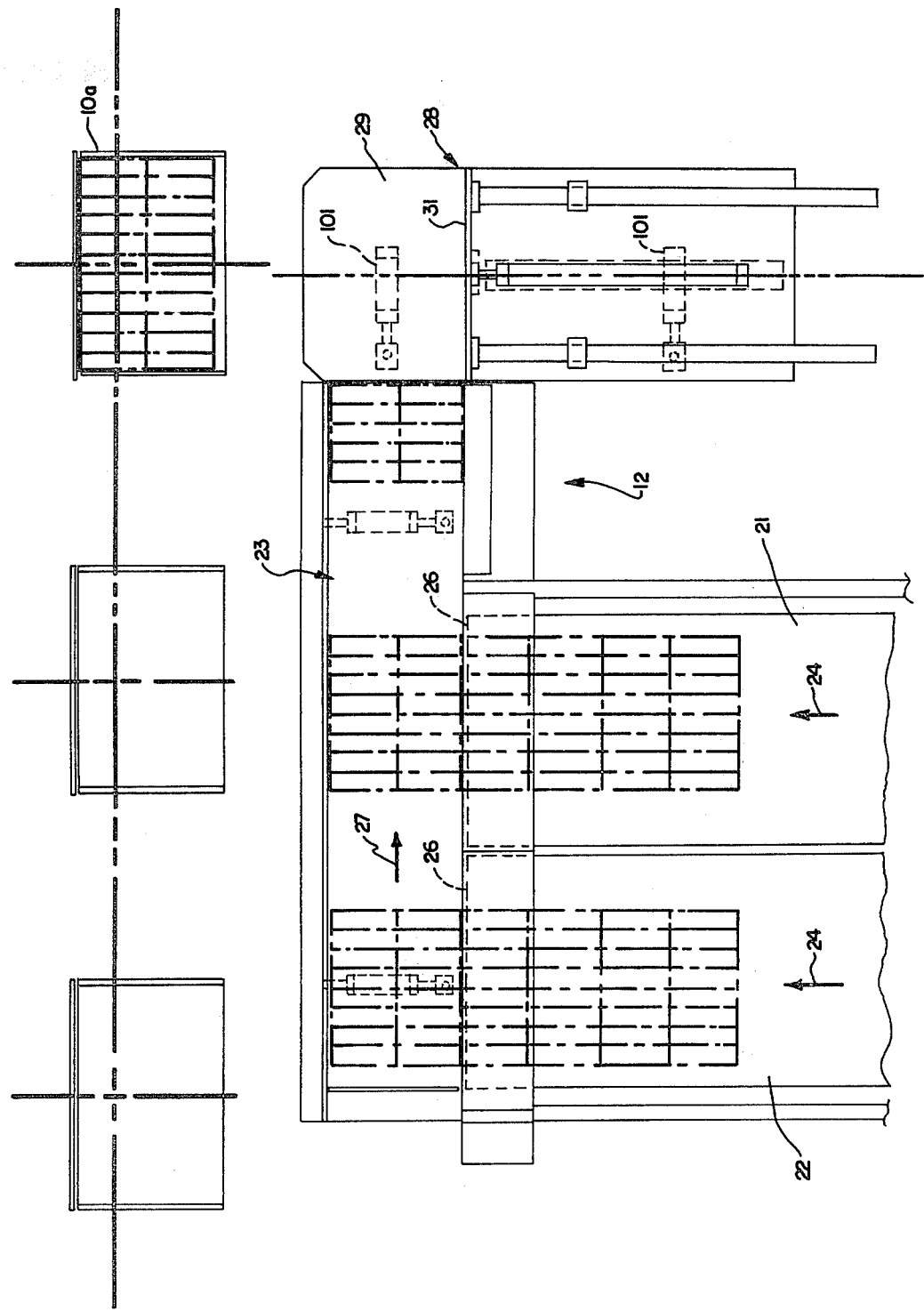
FIG. 2 is a plan view of one of the plurality of loader subassemblies provided in the total system and illustrates the principal components thereof.

Referring to FIG. 2, the loader subassembly 12 includes two supply conveyors 21 and 22 which extend parallel to each other and both extend to a marshaling conveyor 23. Both of the supply conveyors operate to move a brick positioned thereon in a direction of the arrows 24 to a discharge end at 26 adjacent to the marshaling conveyor 23. As discussed in greater detail below, the marshaling conveyor receives groups of brick from the two associated supply conveyors 21 and 22 and thereafter transports or conveys such brick in the direction of the arrow 27 to a transfer tray assembly 28 which provides a transfer tray 29 which is movable from a retracted position illustrated in FIG. 2 in alignment with the marshaling conveyor 23 to an extended position in which it extends into an associated jig box 10a. A stripper plate 31 is operable to extend with respect to the transfer tray as the transfer tray is retracted from its extended position within the jig box 10a. This retains the brick in the jig box as the tray is retracted, to thus complete the deposit of the brick within the jig box.

Figure 3:
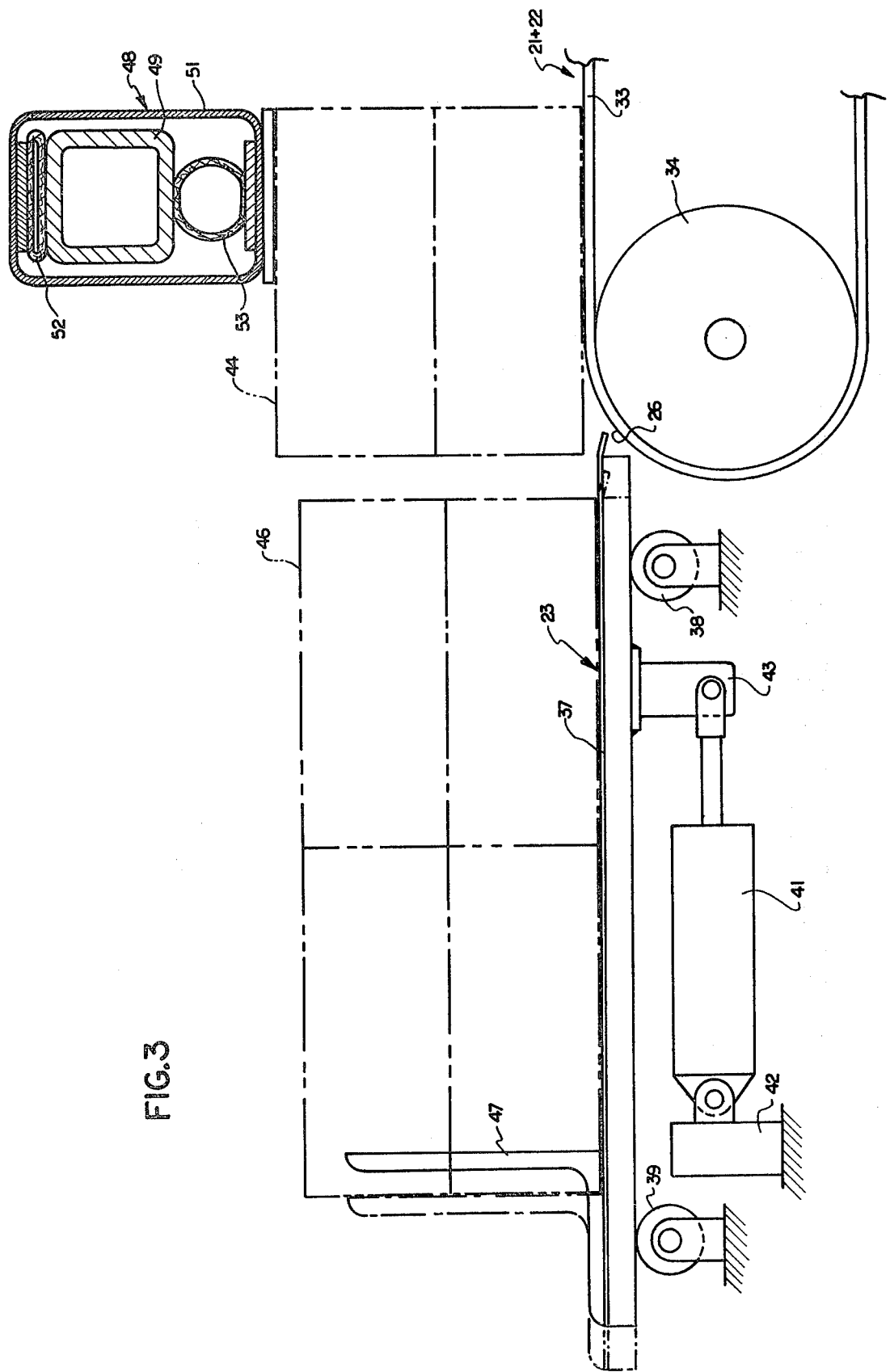
FIG. 3 is an enlarged, fragmentary section, illustrating the relationship between the supply conveyors and the marshaling conveyor.

Referring now to FIG. 3, the supply conveyors 21 and 22 each include a belt 33 which extends over a forward pulley 34 at the exit end 26 and is powered to move bricks supported by the conveyor to the left, as viewed in FIG. 3, onto the marshaling conveyor 23. The marshaling conveyor 23 provides a support plate 37 which is supported on rollers 38 and 39 carried by the machine frame for limited movement toward and away from the associated supply conveyors. Power for producing such limited movement is provided by a piston and cylinder actuator 41 supported at one end on a portion of the machine frame 42 and connected at its other end to a depending projection 43. Extension of the actuator 41 moves the support plate 37 to the right to the full line position, and retraction of the actuator 41 moves the support plate 37 to the left to the phantom line position. In the illustrated embodiment, the movement of the support plate is on the order of one inch and the purpose of such movement is to create a separation between the brick 44 at the exit end 26 of the conveyors 21 and 22 and the brick 46 supported on the support plate 37. Such separation ensures that the brick remaining on the supply conveyors do not interfere with the movement of the brick along the marshaling conveyor.

A stop plate 47 is positioned on the support plate 37 in alignment with the two supply conveyors 21 and 22 and is located to be engaged by the brick 46 when two rows are moved by the supply conveyors onto the support plate, as illustrated in FIG. 3.

When the two rows are properly positioned, a pneumatically operated clamp 48 is operated to clamp the forwardmost brick 44 on the conveyor to prevent movement of such brick 44 as the actuators 41 are retracted to create space between the brick 44 and 46. Such clamp mechanism includes a fixed bar 49 extending lengthwise along a rectangular clamping element 51. Positioned between the bar 49 and the clamping element 51 are upper and lower air tube actuators 52 and 53, respectively. Such actuators 52 and 53 are normally formed of a flexible hose, such as fire hose. When the upper hose 52 is pressurized while the lower hose is exhausted, the clamp element 51 is raised up clear of the brick 44. Conversely, when a lower hose 53 is pressurized while the upper hose is exhausted, the clamping element 51 is moved downwardly with respect to the fixed bar 49 into clamping engagement with the brick 44 adjacent to the exit end 26 of the associated supply conveyors.

Figure 4:
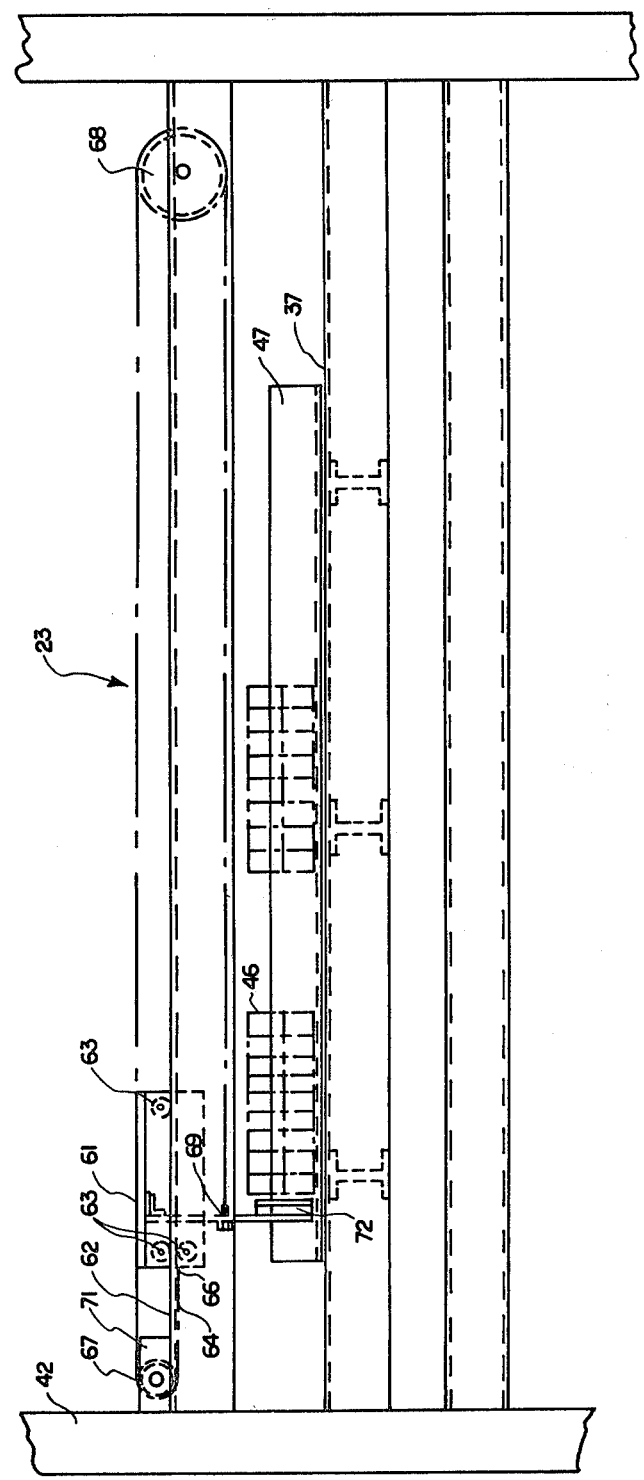
FIG. 4 is a side elevation of the marshaling conveyor, illustrating the pusher which operates to push the groups of brick therealong.

Referring now to FIG. 4, the marshaling conveyor 23 is provided with a pusher carriage 61 supported for horizontal movement on a track 62 by pulleys 63 which are journaled on the carriage 61 and roll along the track 62. A chain drive 64 is connected at one end at 66 to the carriage and passes over a power sprocket 67 mounted on the machine frame 42. The chain drive extends from the power sprocket 67 to an idler sprocket 68 and then back to and is connected at 69 to the carriage. With this structure, operation of the drive sprocket 67 in an anticlockwise direction causes the carriage to be moved to the right, as viewed in FIG. 4, and in a clockwise direction causes the carriage to move to the left. A suitable motor 71 is connected to drive the sprocket 67. Depending from a carriage 61 is a pusher plate 72 which engages brick 46 supported by the support plate 37 and operates to push such brick to the right, as viewed in FIG. 4, onto the transfer tray 28 as described in detail below.

Figure 5:
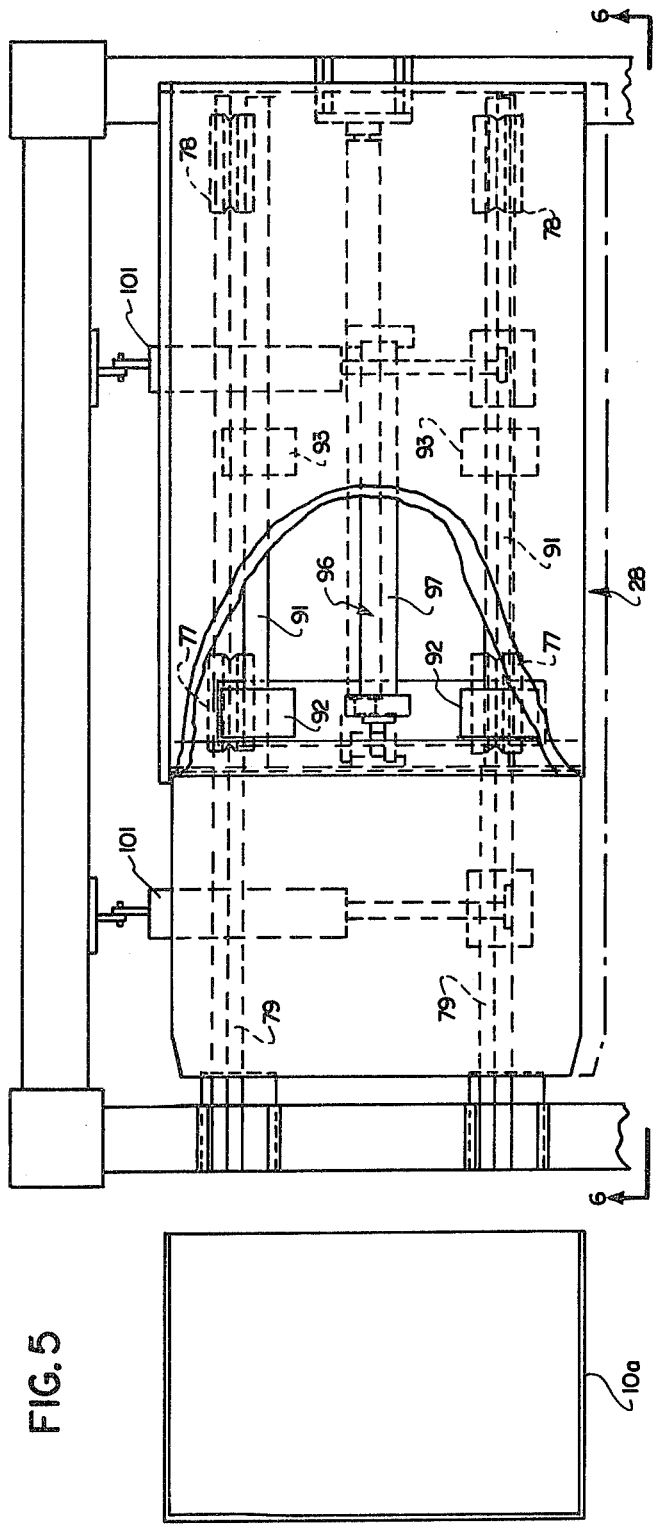
FIG. 5 is a plan view of the transfer tray structure.
Figure 6:
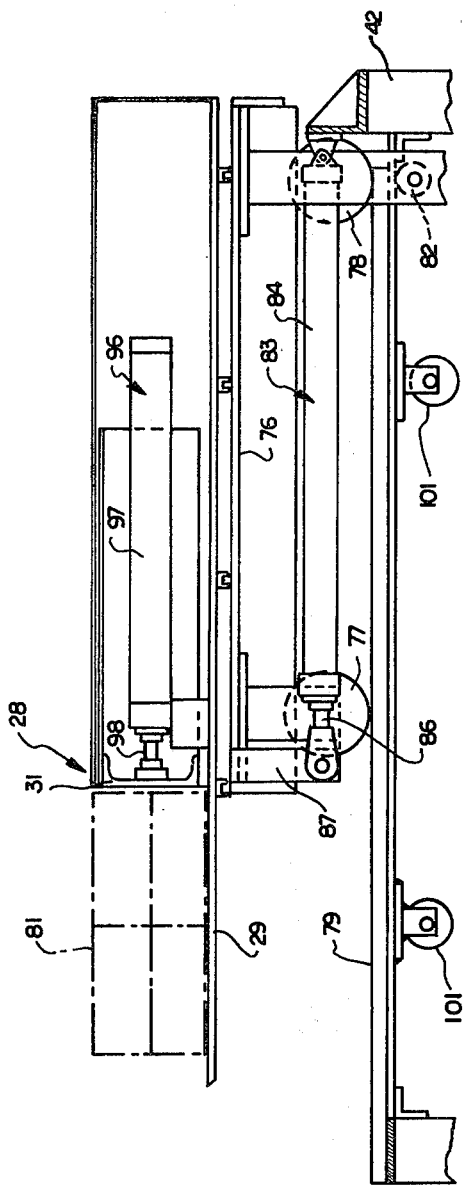
FIG. 6 is a side elevation of the transfer tray system illustrating the actuators for operating the transfer tray and the transfer tray stripper.

FIGS. 5 and 6 best illustrate the structure in operation of the transfer assembly 28. Such transfer includes a carriage 76 supported by pairs of rollers 77 and 78 which roll along spaced and parallel tracks 79 so that the carriage 76 is freely movable between the retracted and extended positions. In order to ensure that a load of brick 81 supported on the transfer tray 29 does not cause the carriage 76 to tip forward, a retainer roller 82 engages the underside of the track 79, as illustrated in FIG. 6.

A piston and cylinder actuator 83 is provided with a cylinder 84 pivotally connected to the machine frame 42 and a piston 86 pivotally connected to a depending projection 87 on the carriage 76 so that when the piston is extended from a position illustrated in FIG. 6, the carriage rolls to the left toward the extended position in which the transfer tray 29 extends into the associated jig box 10a. Retraction of the piston 86, on the other hand, returns the carriage and the transfer tray 29 to the retracted position illustrated. The stripper plate 31 is supported by rods 91 which extend through bearings 92 and 93 mounted on the rearward extension of the transfer tray 29 so that the stripper plate is guided for longitudinal movement with respect to the transfer tray between the retracted position of FIGS. 5 and 6 and an extended position. An actuator 96 provides a cylinder 97 mounted on the transfer tray 29 and a piston 98 connected to the stripper plate 31 and is operable to extend and retract the stripper plate with respect to the transfer tray 29.

In operation, the transfer tray 29 is loaded with a double layer of brick sized to fit the jig box 10a while it is in the retracted position in alignment with the end of the marshaling conveyor 23. Thereafter, the actuator 83 extends to move the transfer tray 29 with the brick resting thereon out into the jig box 10a. During such movement, the actuator 97 does not operate, but merely moves with the transfer tray 29. After the transfer tray 29 is extended into the jig box 10a, the actuator 97 is extended as the actuator 83 is retracted, so that the bricks are stripped off the transfer tray and remain in the jig box as the transfer tray is retracted. After the transfer tray is retracted by the actuator 83, the stripper plate 31 is also retracted by its actuator 97 to return the system to the position illustrated in which it can be loaded with a subsequent load 81 of brick.

As best illustrated in FIGS. 5 and 6, the forward end of the transfer tray extends beyond the brick positioned on the tray. The edges of this projecting end are tapered inward at 100 to provide camming surfaces which cause any required limited lateral movement of the jig box 10a into the exact position in which the box can receive the main portion of the tray. Because the brick are supported back from the camming surfaces 100, this alignment function is completed before the brick enter the jig box and the brick do not hang up on the side of the jig box. Because the brick are spaced back from the forward edge 105 of the tray 29, the extension of the transfer tray 29 does not produce complete insertion of the brick. However, the stripper 31 operates to push the brick forward the remaining short distance to the fully inserted position, and retains the brick in such fully inserted position as the transfer tray is retracted.

In some instances, rollers are mounted on the transfer tray at the forward end to provide the camming surfaces which produce the lateral alignment of the jig boxes. Such rollers tend to eliminate wear which can result from the camming surfaces 100.

Here, again, means are provided to cause a small separation between the brick remaining on the marshaling conveyor and the brick supported by the transfer tray once the tray is loaded and before the tray is extended. This lateral movement utilizes actuators 101, which are connected between the frame 42 and the tracks 79 and operate to move the tracks laterally in a direction away from the marshaling conveyor through a distance of about one inch. Of course, as the tracks move laterally away from the marshaling conveyor, they cause lateral movement of the carriage 76 and the transfer tray 29.

Figure 7A:
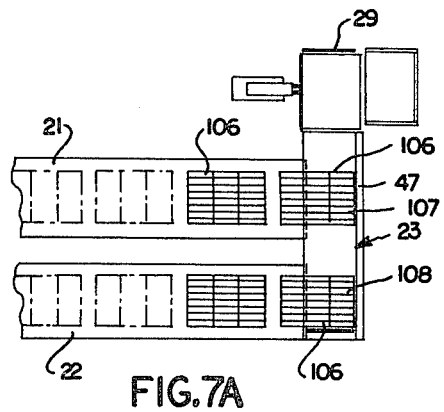
FIGS. 7a through 7f are schematic operational views of the system, illustrating the various operational steps performed by the system.

The various operations are best illustrated in FIGS. 7a through 7f. Initially, spaced groups 106 are positioned on the supply conveyors 21 and 22 by a kiln car unloader of any suitable type, such as the type illustrated in U.S. Pat. No. 3,656,634. Such groups in the illustrated embodiment contain three double rows of endwise abutting brick each containing eight laterally abutting brick. The two conveyors 21 and 22 are then operated to move the groups of brick to the right, as viewed in FIG. 7a, until the forwardmost brick engage the stop plate 47, which prevents continuing movement of the forward group 106. The forwardmost group includes two rows resting on the marshaling conveyor 23 and one row remaining on the supply conveyor. The marshaling conveyor is loaded with spaced second groups 107 and 108 consisting of two rows each, as illustrated in FIG. 7a.

Figure 7B:
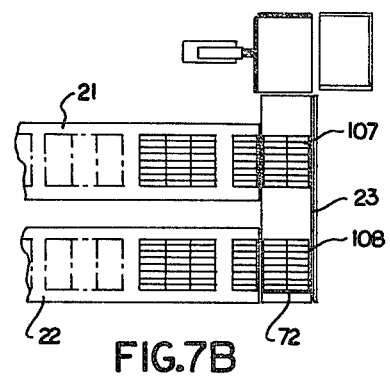
Figure 7C:
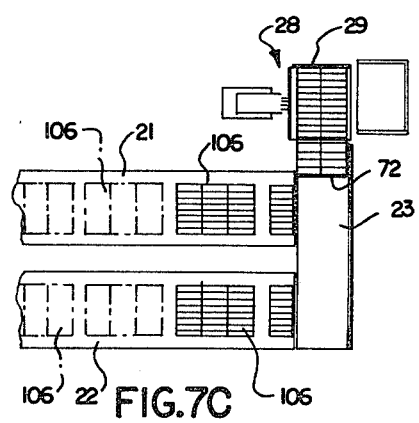
Figure 7D:
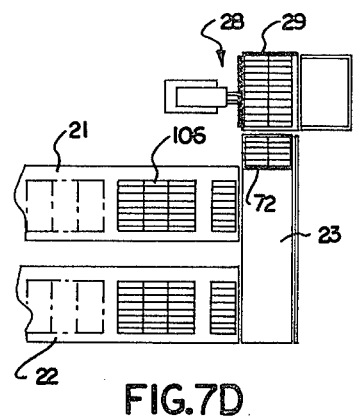
Figure 7E:
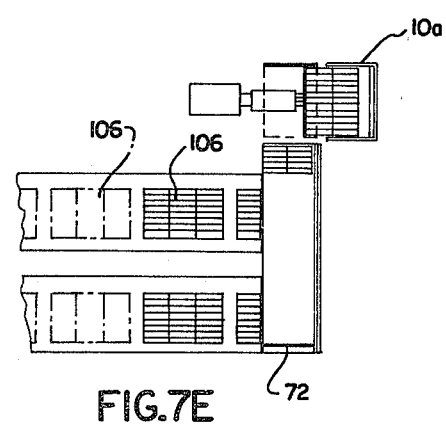

The clamp mechanism 48 is operated to clamp and hold the forwardmost row on the supply conveyors and the marshaling conveyor is moved laterally away from the supply conveyors a short distance by the actuators 41 to the position of FIG. 7b. The pusher 72 is then operated to slide the second groups 107 and 108 along the marshaling conveyor. During the initial movement, group 108 is moved into engagement with the group 107, causing consolidation of the two groups, and subsequently the two groups are moved by the pusher 72 to the position of FIG. 7c, wherein the forward 11 abutting bricks of each row are pushed onto the transfer tray 29 of the transfer 28, as illustrated in FIG. 7c. The transfer 28 is then shifted laterally a short distance from the marshaling conveyor 23, as illustrated in FIG. 7d, to provided a clear separation between the brick remaining on the marshaling conveyor and the bricks resting on the transfer tray 29. In this instance, the remaining brick from the two consolidated groups 107 and 108 which remain on the marshaling conveyor 23 have five abutting brick in each row. The pusher 72 is then retracted while the transfer tray is extended to transfer the brick resting thereon into the jig box 10a. As the transfer tray 29 is retracted, as illustrated in FIG. 7f, the stripper plate 31 extends to complete the insertion of the brick into the jig box and to retain the brick therein as the transfer tray 29 is retracted.

Figure 7F:
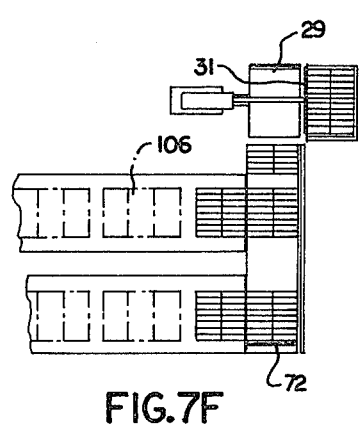

During such stripping plate 31 operation, the supply conveyors operate to move two additional double rows onto the marshaling conveyor, as illustrated in FIG. 7f. As this is done, the forward row of the second group is moved forward into engagement with the last row of the first group, so the two rows on the marshaling conveyor include a row from each of the adjacent but initially spaced groups on the supply conveyor. This action of consolidating the spaced groups by the supply conveyors permits the rearrangement of groups from three rows to two rows.

As illustrated in FIG. 4, the marshaling conveyor extends laterally beyond the line of brick supported on the supply conveyor 21 a distance at least equal to the length of a row containing 10 brick so that a partial load of brick remaining on the marshaling conveyor will not interfere with the subsequent operation of the supply conveyors to load the marshaling conveyor. In a start-up situation, as illustrated in FIGS. 7a through 7f, the rows remaining on the marshaling conveyor, after the first group is positioned on the transfer tray, contain five laterally abutting brick. The two groups 107 and 108 each contain eight laterally abutting brick which are consolidated as a supply containing 16 brick. Of such 16 brick, 11 are positioned on the transfer tray for transfer as a unit to the jig box. During the next operation of the two supply conveyors 21 and 22, additional second groups containing eight laterally abutting brick in each group are consolidated with each other and with the remaining group consisting of five laterally abutting brick, for a total supply of 21 brick. Of such 21 brick, 11 are moved onto the transfer tray, leaving rows containing 10 laterally abutting brick on the end of the marshaling conveyor 23. During the subsequent operation, an additional 16 brick are transferred and consolidated with the 10 remaining on the marshaling conveyor to provide a supply containing rows including 26 laterally abutting brick.

The marshaling conveyor then moves the first 11 of such rows onto the transfer tray, leaving 14 brick on the end of the marshaling conveyor. During such operation, the pusher 72 does not retract and the supply conveyors do not operate to feed additional brick until the transfer tray 28 operates through two cycles to transfer two groups containing rows of 11 laterally abutting brick, leaving rows containing only 4 on the end of the marshaling conveyor.

When the marshaling conveyor 23 is provided with the ability to support partial groups containing as many as 10 laterally abutting brick with clearance to receive additional brick from the supply conveyors, higher speed operation can be achieved because each time the pusher 72 operates to move brick onto the transfer tray, sufficient brick are available to provide a complete full load.

It should be understood that suitable limit switches and optical sensors along with control valves are interconnected so that various actuators and conveyor feeds function to properly achieve loading of the proper number of brick during each machine cycle. As mentioned above, in the illustrated machine, double layers are loaded during each machine cycle, since the brick are supplied to the supply conveyors two high. However, it is within the scope of this invention to operate one high without any significant operational change.

After a double layer is positioned in a given jig box by the first loader subassembly 12, the jig box is moved by the monorail system to receive another double layer from the loader subassembly 13, and so on, until each jig box is carried past the five loader subassemblies and the jig box contains a stack of 10 layers of brick. Normally, the successive loaders 13 through 16 are each positioned higher than the preceding loader so that each subsequent loader positions its double layer on top of the previously loaded layer. However, if desired, the monorail can be arranged to lower the jig boxes as they are indexed to successive loaders to establish proper relative height therebetween.

With the present invention, it is not necessary to provide any particular relationship between the size of the groups of bricks supplied to the loaders and the size of the groups of brick placed in the jig boxes. By consolidating the groups in one direction on the supply conveyors and in a perpendicular direction on the marshaling conveyor, the various sections of the machine can be supplied with compacted groups of brick suitable for loading in substantially any size jig box from a supply of brick grouped in substantially any size. Further, with the present invention, it is possible to provide the automated loading of existing jig box systems while maintaining the maximum use of existing equipment.

Although the preferred embodiment of this invention has been shown and described, it should be understood that various modifications and rearrangements of the parts may be resorted to without departing from the scope of the invention as disclosed and claimed herein.

What is claimed is:

1. An apparatus for stacking brick in jig boxes or the like, comprising a plurality of loading stations to which said jig boxes are sequentially moved, a transfer at each loading station, brick handling means associated with each transfer operable to position a layer of brick on each transfer sized to provide a full layer of brick in said jig box, said transfers sequentially operating to deposit said layers in jig boxes as they move to said loading stations until said jig boxes are loaded, each transfer including a transfer tray movable between a retracted position and an extended position, said trays receiving said layers in said retracted position and extending into said jig boxes in said extended position, and stripper means operable to hold said layers in said jig boxes as said trays return to said retracted position, said trays providing locating means positioned on the forward end thereof operable to laterally position said jig boxes with respect to said trays as said trays move toward said extended position before a layer of brick carried by said trays enters said jig boxes said trays moving said brick a portion of the way into said jig boxes, and said stripper means operating to move said brick through a remaining portion of the way into said jig boxes 2. An apparatus as set forth in claim 1, wherein said locating means are provided by camming surfaces at the forward end of said trays which engage the sides of said jig boxes to cam said jig boxes into alignment with said trays, and said layers are located on said trays back from said camming surfaces so that said alignment is completed before said bricks enter said jig boxes.

3. An apparatus for stacking brick in jig boxes or the like, comprising a plurality of loading stations to which said jig boxes are sequentially moved, a transfer at each loading station, brick handling means associated with each transfer operable to position a layer of brick on each transfer sized to provide a full layer of brick in said jig box, said transfers sequentially operating to deposit said layers in jig boxes as they move to said loading stations until said jig boxes are loaded, each transfer including a transfer tray movable between a retracted position and an extended position, said trays receiving said layers in said retracted position and extending into said jig boxes in said extended position, stripper means operable to hold said layers in said jig boxes as said trays return to said retracted position, and locating means provided by camming surfaces at the forward end of said trays which engage the sides of said jig boxes to cam said jig boxes into alignment with said trays as said trays move toward said extended position, and said layers being located on said trays back from said camming surfaces so that said alignment is completed before said bricks enter said jig boxes, said trays moving said brick a portion of the way into said jig boxes, and said stripper means operating to move said brick through a remaining portion of the way into said jig boxes.

4. An apparatus as set forth in claim 3, wherein said layers contain a first predetermined number of rows of a second predetermined number of bricks, and said handling means operate to rearrange a supply of brick consisting of a different number of rows of a different number of brick into layers on said tray.

5. An apparatus as set forth in claim 4, wherein said handling means includes a supply conveyor operable to consolidate spaced groups of brick in one direction and a marshaling conveyor operable to consolidate spaced groups of brick in another direction, said conveyors supplying such consolidated brick to said trays to produce said layers.

6. An apparatus as set forth in claim 5, wherein said marshaling conveyor is operable to support rows of abutting brick adjacent to said trays in rows having at least said second predetermined number of brick minus one therein.

7. An apparatus for stacking full layers of brick in jig boxes or the like, comprising a transfer means including a tray horizontally movable from a receiving position spaced from said jig boxes to a loading position within said jig boxes, handling means operable to position said layers of brick on said trays in said receiving position, and stripper means operable to retain said layers of brick in said jig boxes when said tray is moved from said loading position, said tray being formed with converging camming surfaces spaced forward from said layers of brick operable to engage said jig boxes and laterally position said jig boxes relative to said tray before said layers of brick enter said jig boxes said trays moving said brick a portion of the way into said jig boxes, and said stripper means operating to move said brick through a remaining portion of the way into said jig boxes.

8. An apparatus as set forth in claim 7, wherein said apparatus includes a plurality of trays operable to sequentially position layers in said jig boxes on layers positioned therein by preceding trays.

9. An apparatus for stacking brick on a jig box or the like, comprising a supply conveyor adapted to receive spaced groups of abutting rows each containing abutting brick, said supply conveyor being operable to consolidate said groups in a first direction, a marshaling conveyor operable to receive abutting rows of abutting brick from said supply conveyor in second spaced groups each containing a number of rows different from the number of rows in said first groups, said marshaling conveyor being operable to consolidate said second groups in a direction substantially perpendicular to said first direction to produce a supply of brick containing rows of abutting brick having a greater number of abutting brick than the number of abutting brick in the rows of said second groups, a transfer operable to receive rows of abutting brick from said marshaling conveyor containing a number of abutting brick different from the number of abutting brick in the rows of said second groups and operable to transfer said rows to said jig box or the like.

10. A method of stacking brick on a jig box or the like with layers of a first predetermined number of rows containing a second predetermined number of abutting brick, comprising consolidating in one direction spaced groups of brick including third predetermined numbers of rows each containing fourth predetermined numbers of brick to provide a first supply of abutting rows of abutting brick wherein the number of abutting rows in said first supply exceeds said first and third predetermined number of rows and said rows contain said fourth predetermined number of abutting brick, separating from said first supply second groups having said first predetermined number of rows each containing said fourth predetermined number of abutting brick, consolidating said second groups into a second supply of brick containing said first predetermined number of rows each containing a greater number of brick than said second predetermined number of abutting brick, separating said layers from said second supply on a transfer, and transferring said layers to said jig box or the like.

11. A method as set forth in claim 10, wherein said consolidation of said second groups into said second supply is performed in a second direction substantially perpendicular to said first direction.

12. An apparatus for stacking brick in jig boxes or the like, comprising a plurality of loading stations to which said jig boxes are sequentially moved, a transfer at each loading station, brick handling means associated with each transfer operable to position a layer of brick on each transfer sized to provide a full layer of brick in said jig box, said transfers sequentially operating to deposit said layers in said jig boxes as they move to said loading stations until said jig boxes are loaded, said handling means including a supply conveyor operable to receive first spaced groups of brick each containing a first predetermined number of rows in which said rows each contain a second predetermined number of laterally abutting brick, and means to rearrange said brick into said layers positioned on said trays, said layers of brick each including a third predetermined number of rows different from said first predetermined number of rows in which each row contains a fourth predetermined number of laterally abutting brick different from said second predetermined number of laterally abutting brick.

* * * * *